United States Patent
Nashif et al.

(10) Patent No.: US 9,373,098 B2
(45) Date of Patent: Jun. 21, 2016

(54) METHOD AND APPARATUS FOR OPTIMIZED SHIPPING STRATEGIES ACCOUNTING FOR ENDPOINT REQUIREMENTS

(71) Applicant: INTELLIGRATED HEADQUARTERS LLC, Mason, OH (US)

(72) Inventors: Hazem Nizar An Nashif, Oakland, CA (US); Thomas Frederick Brady, Chattanooga, TN (US)

( * ) Notice: Subject to any disclaimer, the term of this patent is extended or adjusted under 35 U.S.C. 154(b) by 227 days.

(21) Appl. No.: 14/083,796

(22) Filed: Nov. 19, 2013

(65) Prior Publication Data

US 2014/0074745 A1 Mar. 13, 2014

Related U.S. Application Data

(63) Continuation-in-part of application No. 13/068,940, filed on May 24, 2011.

(51) Int. Cl.
  *G06F 7/00* (2006.01)
  *G06Q 10/08* (2012.01)
  *G06Q 10/04* (2012.01)

(52) U.S. Cl.
  CPC .............. *G06Q 10/083* (2013.01); *G06Q 10/04* (2013.01); *G06Q 10/08* (2013.01)

(58) Field of Classification Search
  USPC ........................................................ 700/216
  See application file for complete search history.

(56) References Cited

U.S. PATENT DOCUMENTS

| | | |
|---|---|---|
| 4,692,876 A | 9/1987 | Tenma et al. |
| RE33,416 E | 10/1990 | Konishi et al. |
| 5,501,571 A | 3/1996 | Van Durrett et al. |
| 5,636,966 A | 6/1997 | Lyon et al. |
| 5,903,464 A | 5/1999 | Stingel, Jr. et al. |
| 6,425,226 B1 | 7/2002 | Kirschner |
| 6,505,093 B1 | 1/2003 | Thatcher et al. |
| 7,266,422 B1 | 9/2007 | DeMotte et al. |
| 7,356,495 B2 | 4/2008 | Beigl et al. |
| 7,363,104 B2 | 4/2008 | Stevens |
| 7,591,630 B2 | 9/2009 | Lert, Jr. |
| 7,603,291 B2 | 10/2009 | Raiyani et al. |
| 7,657,467 B2 | 2/2010 | DeGanis et al. |
| 7,877,164 B2 | 1/2011 | Grunbach et al. |
| 7,991,505 B2 | 8/2011 | Lert, Jr. et al. |
| 8,055,377 B2 | 11/2011 | Yair et al. |
| 8,326,679 B1 * | 12/2012 | Rowe ............... G06Q 10/08 705/26.2 |
| 8,468,781 B2 | 6/2013 | Fritzsche et al. |
| 8,473,316 B1 * | 6/2013 | Panzitta ........... G06Q 30/0234 705/26.81 |
| 8,718,814 B1 * | 5/2014 | Clark ............... G06Q 10/08 700/214 |
| 2008/0120129 A1 | 5/2008 | Seubert et al. |

(Continued)

FOREIGN PATENT DOCUMENTS

WO 0068856 11/2000

OTHER PUBLICATIONS

International Search Report and Written Opinion dated Sep. 28, 2012 for application No. PCT/US2012/039291.

(Continued)

*Primary Examiner* — Kyle Logan (57) ABSTRACT

Systems, methods, and devices of the various embodiments enable cartonization of products for store replenishment based on the individual store layout of each store of a group of stores to which the cartonized products are to be provided.

30 Claims, 9 Drawing Sheets

(56) References Cited

U.S. PATENT DOCUMENTS

| | | | |
|---|---|---|---|
| 2009/0319324 A1* | 12/2009 | Lee | G06Q 10/0631 705/7.12 |
| 2010/0178149 A1 | 7/2010 | Fritsche | |
| 2011/0106296 A1 | 5/2011 | Stevens et al. | |
| 2012/0101627 A1* | 4/2012 | Lert | B65G 1/1378 700/216 |
| 2014/0067467 A1* | 3/2014 | Rangarajan | G06Q 30/02 705/7.31 |

OTHER PUBLICATIONS

Dematic, "Dematic's Insight reveals smarter, faster, safer order picking", available at http://www.industrysearch.com.au/dematic-s-insight-reveals-smarter-faster-safer-order-picking/n/46977, (Sep. 24, 2010).

"Packed and Ready to Go", Fastener and Fixing Magazine, Issue 53, p. 141, (Sep. 2008), United Kingdom, available at http://fastenerandfixing.com/fastenerandfixing/Magazine_Archive_html.

"Dematic Mixed Case Palletizing Solutions" Dematic Logistics Review, Issue 1, Sydney, Australia, pp. 22-24, (2010).

Lacefield, S.K., "10 tips for improving piece picking: '6. Be store friendly", DC Velocity, Material Handling, (Feb. 25, 2010).

Kurt Salmon Associates, "Survey of Supply Chain Effectiveness", (Nov. 12, 2002).

Holste, "Logisitcs News: DCs Facing New Customer Service Challenges", Supply Chain Digest, http://www.scdigest.com/assets/Experts/Holste_10-07-14.php, (Jul. 14, 2014).

Il-Choe, et al., "Small Parts Order picking: Design and Operation", School of Industrial and Systems Engineering Georgia Institute of Technology, Georgia Tech Research Corp., Atlanta, GA, (1991).

Dematic AMCAP—Product Details, http://www.remastersys.com/sale/pz2c2597a-z1b0ed9-demantic-amcap.html, (Mar. 15, 2011).

McMahon, "Maximizing Efficiency with Mixed-Case Palletizing", Automation, www.MHMonline.com, Material Handling Management, pp. 32-35, (May 2010).

Demantic, "Dansk Supermarked Gruppen Places Significant order with Demantic for Highly Flexible, High Productivity Order Assembly System," press release, http://www.prweb.com/releases/Logistics/Retail/prweb2381934.htm; pp. 1-4, (May 5, 2009).

"Demantic developpe le systeme de palettisation automatique de palettes heterogenes le plus rapide du monde: l'AMCAP" press release, http://www.faq-logistique.com/Communique-presse20080219-Dematic-Palettisation-Automatique-AMCAP.htm, pp. 1-2, (2008).

Dematic brochure, "Dematic AMCAP—Mischpaletten automatisch kommissioniert", http://donar.messe.de/exhibitor/cemat/2011/1248434/dematic-amcap-palettiersystem-fur-ischpaletten-ger-133266, (2008).

McMahon, "Maximizing Efficiency of Store-Friendly Pallets with Automated Mixed-Case Palletizing", Logistics Online Newsletter, http://www.logisticsonline.com/doc/maximizing-efficiency-store-friendly-pallets-0002, (Jan. 26, 2010).

Trebilcock, "Automation: Kroger changes the distribution game", http://www.supplychain247.com/article/automation/kroger/changes_the_game/0), (Jul. 4, 2011).

AMCAP, Standard Character Mark, Serial No. 77787712 filed Jul. 23, 2009, registration No. 4257963, registered, (Dec. 11, 2012).

Non-Final Office Action issued in U.S. Appl. No. 13/068,940 on Apr. 25, 2014.

Notice of Allowance received in connection with U.S. Appl. No. 13/068,940 dated Jan. 22, 2015.

Non-final Office Action received in connection with U.S. Appl. No. 13/068,940, dated Nov. 19, 2014.

* cited by examiner

| STORE 1001 | | | | | | |
|---|---|---|---|---|---|---|
| SKU | DEPT | AISLE | AISLE SIDE | BAY | SHELF | POSITION |
| 1215 | Hair Care | 5 | L | A | 1 | SH1 |
| 1333 | Hair Care | 5 | L | A | 2 | SH2 |
| 1445 | Hair Care | 5 | L | A | 3 | SH3 |
| 1446 | Hair Care | 5 | L | A | 4 | SH4 |
| 2002 | Home | 7 | R | A | 1 | OM2 |
| 3665 | Office | 8 | L | A | 1 | IC3 |

504

| STORE 1002 | | | | | | |
|---|---|---|---|---|---|---|
| SKU | DEPT | AISLE | AISLE SIDE | BAY | SHELF | POSITION |
| 1215 | Hair Care | 3 | L | A | 1 | SH6 |
| 1333 | Hair Care | 3 | R | B | 1 | SH7 |
| 1445 | Hair Care | 4 | L | C | 3 | SH8 |
| 1446 | Hair Care | 4 | L | C | 4 | SH9 |
| 2002 | Home | 8 | L | A | 1 | OM2 |
| 3665 | Home | 7 | R | A | 1 | IC3 |

| Store | Carton | Size | SKU | QTY |
|---|---|---|---|---|
| 1001 | 1 | Size A | 1215 | 1 |
| 1001 | 1 | Size A | 1333 | 2 |
| 1001 | 1 | Size A | 1445 | 1 |
| 1002 | 2 | Size B | 1215 | 2 |
| 1002 | 3 | Size C | 1333 | 1 |
| 1002 | 4 | Size A | 1445 | 12 |
| 1002 | 5 | Size A | 1446 | 1 |
| 1002 | 6 | Size B | 2002 | 2 |
| 1002 | 7 | Size A | 3665 | 5 |

METHOD AND APPARATUS FOR OPTIMIZED SHIPPING STRATEGIES ACCOUNTING FOR ENDPOINT REQUIREMENTS

RELATED APPLICATIONS

This application is a continuation in part of and claims priority to co-pending U.S. patent application Ser. No. 13/068,940 entitled "Method and Apparatus for Optimized Shipping Strategies Accounting for Endpoint Requirements" filed May 24, 2011, the entire contents of which are incorporated herein by reference.

FIELD

The disclosure set forth herein can be used to implement technology in the field of material handling, particularly as it relates to packaging of items for shipment.

BACKGROUND

Historically, break-pack store replenishment has involved the shipment of products in containers which are packed according to the manner in which the products are stocked in a distribution center (DC). In the DC, products are stocked to maximize efficiency (e.g., as measured by minimal travel time) picking. By contrast, the product layout for a store (often referred to as a "planogram") is generally designed to maximize sales (e.g., by creating a pleasing in-store visual experience, and/or maximizing the likelihood of impulse purchases by shoppers). As a result, the layouts for products used in stores and distribution centers are generally not the same, leading to inefficiencies when products packaged according to the DC stocking scheme are used for store replenishment. For example, totes packaged according to the DC stocking scheme may have products each intended to be stocked in different aisles of the store. The need to replenish different products to different aisles from the same tote can result in extra travel time and distance in the store during replenishment because the restocking employee may be required to transit the products and/or tote between more than one aisle.

The need to avoid inefficiencies in store replenishment caused by differing layouts in stores and DCs is well known in the industry. Past efforts to meet this need have involved synchronizing store layouts with the stocking scheme used in the DC. However, this requires all of the stores serviced by a DC to have the same layout. In practice, this requirement means that attempts to synchronize DC and store layouts will be ineffective, as there is substantial inter-store variation in layouts due to factors such as markets serviced, store age, and store type. Accordingly, there is a long felt but unmet need in the art for technology which can allow a distribution center to service multiple stores having different layouts without decreasing the efficiency of replenishment at the individual stores.

SUMMARY

The systems, methods, and devices of the various embodiments enable cartonization of products for store replenishment based on the individual store layout of each store of a group of stores to which the cartonized products are to be provided.

BRIEF DESCRIPTION OF THE DRAWINGS

The drawings and detailed description which follow are intended to be merely illustrative and are not intended to limit the scope of the invention as contemplated by the inventors.

DETAILED DESCRIPTION

The inventors have conceived of novel technology which, for the purpose of illustration, is disclosed herein as applied to modifying the cartonization process to account for disparate layouts at individual stores. While the application of the inventors' technology in this context satisfies a long-felt but unmet need in the art, it should be understood that the disclosure of the inventors' technology in this context should not be treated as implying limitations on how the inventors' technology can be beneficially applied. For instance rather than (or in addition to) being useful in accounting for disparate layouts at individual stores, the technology disclosed herein could also be used to account for other requirements that vary between endpoints. As an example, consider the case where inventory is being packaged into kits which will later be assembled into some finished good (e.g., a computer). In such a case, aspects of the technology disclosed herein could be used to account for the fact that the selection and packaging for components that will be used in a first kit could be different than the selection and packaging for components that will be used in the second kit, even though the first and second kits might both draw from the same basic inventory of components. Accordingly, the disclosure set forth herein should be understood as being illustrative only, and not limiting.

As used herein, the term warehouse control computer is used to refer to any one or all of cellular telephones, smart phones, personal or mobile multi-media players, personal data assistants (PDA's), laptop computers, tablet computers, smart books, desk top computers, palm-top computers, wireless electronic mail receivers, servers, or other computing devices which include a programmable processor and memory and circuitry for determining a plan for placing one or more products in a carton and generating a set of instructions to control an operation of a cartonization system.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among dynamic databases. A light server or secondary server may be a slimmed-down version of server type functionality that can be implemented on a computing device thereby enabling it to function as an Internet server (e.g., an enterprise e-mail server) only to the extent necessary to provide the functionality described herein.

As used herein, the terms "container" and "carton" are used interchangeably to refer to any object which may capable of holding other objects (e.g., products), such as for shipping or storage. Examples of "containers" and/or "cartons" may include totes, boxes, bags, etc.

Figure 1:
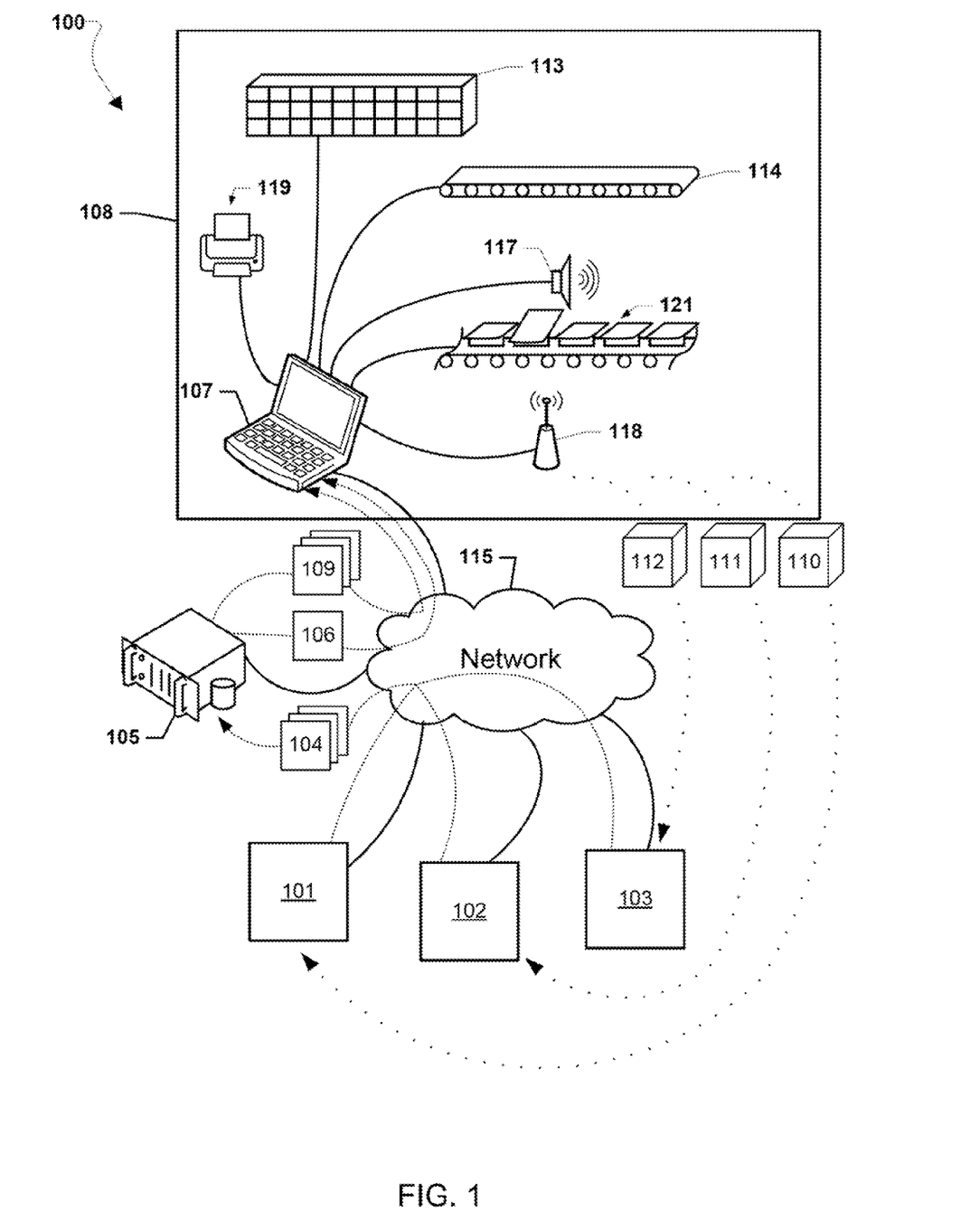
FIG. 1 illustrates a system suitable for use with the various embodiments.

FIG. 1 illustrates a system 100 suitable for use with the various embodiments as well as various embodiment communication flows and product movements within the system 100. The system 100 may include a plurality of stores 101, 102, 103, from which consumers could purchase various goods. In an embodiment, each store 101, 102, 103 may have a different store layout, and goods may be stored in different aisles, aisles sides, shelves, and bays in each of the different stores 101, 102, 103. Each of the stores 101, 102, 103 may include a retail management computer connected to a network 115, such as the Internet. The system 100 may also include a central server 105, such as a retail chain server, which may be connected to the network 115. Via their respective connections to the network 115, the retail management computers at each store 101, 102, 103 and the central server 105 may exchange data. As goods are purchased, and the store inventories are depleted, the retail management computers at the stores 101, 102, 103 report information reflecting the inventory changes 104, such as by sending sales records to the central server 105 for their chain. Information reflecting the inventory changes 104 may be sent to the central server 105 in any manner, such as by combining it into a single communication before sending it to the central sever 105, or by having each store individual send messages with inventory information to the central server 105. The central server 105, may integrate the inventory information 104 from the stores 101, 102, 103 and use it to create one or more replenishment orders for the chain's suppliers, as well as a fulfillment order 106.

A warehouse control computer 107 running warehouse control software and configured to generate instructions to control the operations of the cartonization system(s) for a distribution center ("DC") 108 may be connected to the network 115, and in this manner the central server 105 and warehouse control computer 107 may exchange data. The central server 105 may send the fulfillment order 106 to the warehouse control computer 107. The central server 105 may also send store layout (i.e., planogram) information 109 for each of the stores 101, 102, 103 to the warehouse control computer 107, and the warehouse control computer 107 may store the planogram 109. In an embodiment, the planogram information 109 may be a file for each store 101, 102, 103 listing products (e.g., by stock keeping unit ("SKU")) sold in each respective store 101, 102, 103 and the products' associated assigned location information (e.g., each product's department, aisle, side, bay, position, etc.) in that respective store 101, 102, 103. The warehouse control computer 107 may use the fulfillment order 106, potentially along with data from a SKU database accessible by the warehouse control computer 107, planogram information 109 for the stores 101, 102, 103 serviced by the DC 108, and/or adjacency group rules to determine a plan for placing each of the products in the fulfillment order 106 into cartons. Based on the determined plan, the warehouse control computer 107 may generate a set of instructions to control the operation of one or more cartonization systems such that the sets of cartons 110, 111, 112 of physical products shipped to the stores 101, 102, 103 may be packaged using the same organization with which they are stocked at the respective stores' 101, 102, 103.

The warehouse control computer 107 may be connected to one or more cartonization system, such as one or more pick to card system 119 (e.g., a system in which a pick list is printed and the printed pick list directs picking), voice directed picking system 117, radio frequency based picking system 118, pick to light system and/or put to light system 113, sorter system (e.g., loop sorter, batch sorter, tilt-tray sorter, etc.) 121, etc., and in this manner, the warehouse control computer 107 may exchange data with the one or more cartonization systems. The warehouse control computer 107 may generate a set of instructions to control the operations of the one or more cartonization systems to control which of the products should be added to each of the sets of cartons 110, 111, 112 based on the determined plan for placing each of the products in the fulfillment order 106 into cartons. This cartonization control could be accomplished, for example, by the computer running pick to light software which would cause the illumination of lights on the ends of a pick face 113 showing how many units of a particular item should be added to a carton. As another example, the same instructions could also instruct warehouse workers when a carton should be closed and placed on a takeaway conveyor 114 for transport to other areas of the DC for further processing and/or loading for shipment.

Of course, although FIG. 1 illustrates only cartonization systems such as a voice directed picking system 117, pick to card system 119, radio frequency based picking system 118, pick to light and/or put to light system 113, sorter system (e.g., loop sorter, batch sorter, tilt-tray sorter, etc.) 121, and takeaway conveyor 114 for DC 108, the DC 108 may include multiple picking technologies depending on factors such as the particular products handled by the DC 108. For example, in practice, some products might be handled using pick to light, others might be handled on RF terminals, others might be handled using cross belt or tilt-tray systems, and so on. While the description below describes how the inventors' technology can be implemented in the context of a single fulfillment system, the technology is not limited to the single system context, and could easily be extended to the context of a DC with multiple integrated fulfillment systems. For example, items could be added to a carton in a first area, followed by the carton being transported to other areas for the items from those areas to be added. The workers who are actually adding items to the carton would not need to be aware of the fact that the back end algorithm which produces the instructions for what items to add to which carton, or for where a carton should be routed next, produces those instructions based on the approaches set forth herein, rather than using conventional approaches. Accordingly, the discussion set forth herein should not be treated as implying that the disclosed technology is limited to any specific approach to fulfilling orders, or that it could not be applied where multiple approaches are used.

An example of a fulfillment order 106 which could be provided to the warehouse control computer 107 for the DC 108 is provided below in table 1.

TABLE 1

Exemplary order information

| Order Header | Store 1001<br>100 Main St<br>Anywhere USA | Pty - 1 |

TABLE 1-continued

Exemplary order information

| Order Detail | SKU | Qty | Description |
|---|---|---|---|
| | 1234 | 1 | Herbal Essence Shampoo 16 oz |

Note that, in the order of table 1, the information provided comprises stock keeping units ("SKUs"), as well as the requested quantities for the SKUs for a particular store. So that the SKUs can be packaged in a form which is convenient for the particular stores, in some embodiments, it is possible that the fulfillment order will include information indicating how the SKUs should be packaged. For example, the SKUs could be listed in the fulfillment order in the same order in which they should be packaged for shipment. Similarly, there could be multiple fulfillment orders reflecting different packages which should be used for shipping the products being ordered. This will allow the organization maintaining the central server 105 to exert a greater degree of control over the cartonization process, with consequent opportunities for that organization to increase the efficiencies in operating its supply chain.

Of course, it should be understood that it is not necessary for order information, such as shown in table 1, to include packaging or layout information as described above. For example, in many cases, the central server 105 will be part of an inventory management system which was designed to create orders that would be fulfilled using prior art technology. As a result, the SKU information in an order created by such a system will most likely be in SKU sequence, with no consideration given to how the products should be packaged or stocked on store shelves. In such a situation, it is possible to accommodate the use of packaging strategies tailored to different endpoints (e.g., different stores with different store layouts) by providing separate endpoint layout information, such as the planogram information 109 illustrated in table 2.

TABLE 2

Exemplary planogram information
WCS Family Group Table

| Store | SKU | Position | Adjacency Micro Plan | Macro Plan | Family Group |
|---|---|---|---|---|---|
| 1001 | 1215 | SH1 | Shampoo | Basic Hair | Hair Care |
| 1001 | 1845 | SH2 | Shampoo | Basic Hair | Hair Care |
| 1001 | 2475 | SH3 | Shampoo | Basic Hair | Hair Care |
| 1001 | 3105 | SH4 | Shampoo | Basic Hair | Hair Care |
| 1001 | 1530 | SH5 | Shampoo | Basic Hair | Hair Care |
| 1001 | 2160 | SH6 | Shampoo | Basic Hair | Hair Care |
| 1001 | 2790 | SH7 | Shampoo | Basic Hair | Hair Care |
| 1001 | 2916 | SH8 | Shampoo | Basic Hair | Hair Care |
| 1001 | 1341 | SH9 | Shampoo | Basic Hair | Hair Care |
| 1001 | 1971 | SH10 | Shampoo | Basic Hair | Hair Care |
| 1001 | 2601 | SH11 | Shampoo | Basic Hair | Hair Care |

In an embodiment, layout information for a store, such as planogram information 109, may indicate the location in the store at which each product is to be placed when replenished. For example, each SKU listed in the planogram information 109 may be associated with an indication of an aisle, bay, aisle side, shelf, and/or shelf position where the product associated with the SKU is to be placed in the store when the product is replenished.

In cases where separate planogram information 109 is provided, if there is a need to combine it with the order information to determine a shipping strategy, this combination can easily be performed. For example, in cases where the planogram information 109 and fulfillment orders 106 are stored as relational database tables, a simple JOIN command based on store and SKU fields can be used. However, creating combined records will not necessarily be required in all implementations. For example, in a case where a shipping strategy is created based on sorting the items in the shipping order, the sort could be performed by, for each item in the order, doing a lookup against the planogram information 109 to identify how that item should be sorted. Other variations (e.g., sending separate information that is used to determine how SKUs are organized where that separate information is not planogram information) are also possible. Accordingly, the discussion above regarding integration of information such as shown in tables 1 and 2 should be understood as being illustrative only, and not limiting.

Of course, it should be understood that fulfillment orders will not necessarily be limited to a single order for a single SKU as shown above in table 1. In a real order, there would likely be a greater number of rows representing different SKUs, and/or different stores. Similarly, the planogram information would not necessarily be limited to a table for a single store (e.g., store 101), and the technology disclosed herein could be implemented to be able to accommodate tables for multiple stores (e.g., by recognizing different store IDs in different rows of the tables). Also, it should be understood that, while FIG. 1 depicts the fulfillment orders and planogram information being transmitted contemporaneously with one another, such contemporaneous transmission is not a requirement, and, in a real system, it is likely that the planogram information would have been provided in advance, as opposed to at the time of the fulfillment orders. As an example, the planogram information 109 for each of a plurality of stores having different layouts may be sent to the warehouse control computer 107 and/or stored in a memory accessible by the warehouse control computer 107 (e.g., a planogram database) before fulfillment order 106 is sent to the warehouse control computer 107. It is also possible that the organization of components shown in FIG. 1 could vary in different implementations of the disclosed technology. For example, in some cases, rather than sending information to a central server 105, which would then send it to the warehouse control computer 107 running the warehouse control software, stores 101, 102, 103 might send their information directly to the warehouse control computer 107. In such a case, the warehouse control computer 107 might (but would not necessarily) report the information it had received to the central server 105 in an inventory management system. Accordingly, FIG. 1 and the related discussion, like tables 1 and 2, should be understood as being illustrative only, and should not be treated as limiting.

Figure 2:
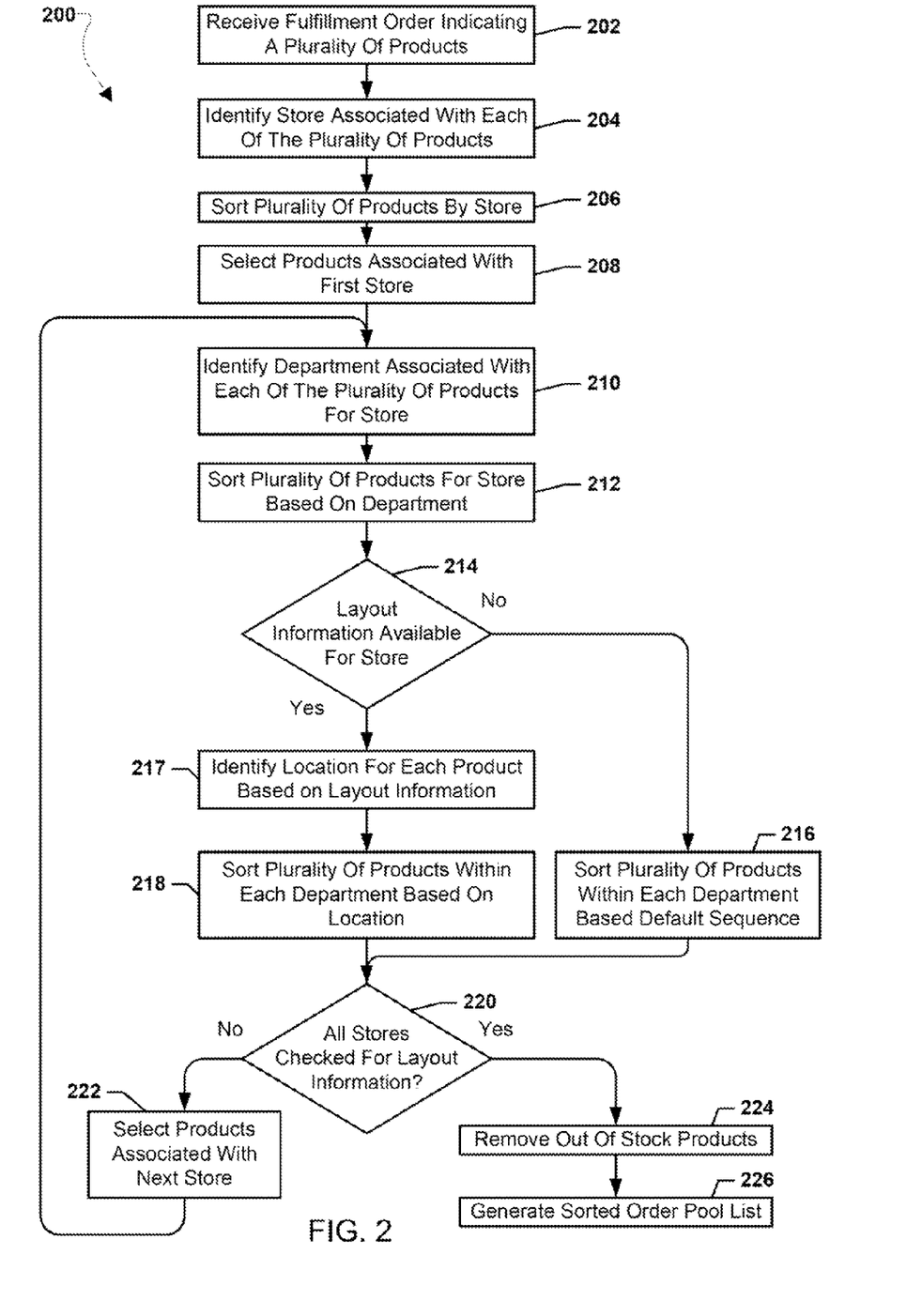
FIG. 2 illustrates an embodiment method for organizing a plurality of products indicated in a fulfillment order based on layout information associated with a store.

Once information such as shown in tables 1 and 2 has been received by the warehouse control computer 107, that information can be used to determine the organization of items for shipping (e.g., to determine a cartonization plan). FIG. 2 illustrates an embodiment method 200 for organizing the plurality of products indicated in a fulfillment order based on layout information (e.g., a planogram) associated with a store. In an embodiment, the operations of method 200 may be performed by the processor of a warehouse control computer.

Initially, the process of FIG. 2 may be kicked off by a trigger. As an example, such a trigger could be timer of some sort (e.g., an instruction which triggers the processes described herein on a daily basis). There could also be multiple times. For example, for some divisions, such as products, departments or stores, cartonization could be performed on a daily basis, for others in a twice weekly basis, for others on an hourly basis. This could be accommodated by including information stating how often (for example) cartonization will be performed for a store when the list of stores is provided. Non-timer triggers are also possible. For example, the trigger could be receiving a list of items to be shipped (e.g., a fulfillment order), or receiving an explicit command from an external system (e.g., the central server 105).

Figure 4:
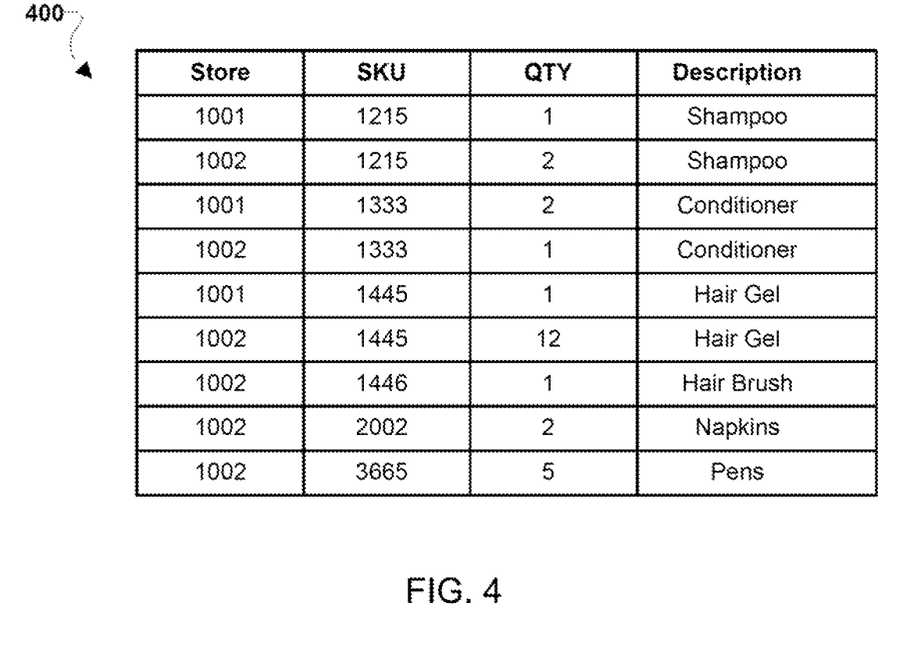
FIG. 4 is a data structure diagram of an example replenishment order.

In block 202 the warehouse control computer may receive a fulfillment order indicating a plurality of products. Fulfillment orders may be generated by a stores and/or central servers and provided to the warehouse control computer via a network as discussed above. A fulfillment order may identify the products (e.g., by SKU) ordered for replenishment by one or more stores. An example, fulfillment order 400 is illustrated in FIG. 4. The fulfillment order 400 may list stores (e.g., identified by a store ID, such as 1001, 1002, etc.), SKU's for products requested by each store, quantities of products requested, and a description of the product (e.g., shampoo, conditioner, hair gel, hair brush, napkins, pens, etc.). The fulfillment order 400 is provided merely as an example illustrating potential fields of a fulfillment order and other fields and/or information may be present in a fulfillment order.

Returning to FIG. 2, in block 204 the warehouse control computer may identify a store associated with each of the plurality of products indicated in the fulfillment order. As an example, the store associated with each of the plurality of products indicated in the fulfillment order may be the store to which each of the plurality of products is to be shipped. In block 206 may sort the plurality of products indicated in the fulfillment order by store. In an embodiment, the sorting of the products by store may result in an order list of plurality products grouped by store and the ordered list may be stored in a memory available to the warehouse control computer. In block 208 the warehouse control computer may select products associated with a first store from the ordered list. In block 210 the warehouse control computer may identify departments associated with each of the plurality of products for the selected store and in block 212 may sort the plurality of products for the selected store by department. As an example, a department may be determined based on the SKU of the product and/or the product description included in the fulfillment order. A SKU database may include information about the product, such as the product's description, universal product codes (UPCs), department, color, size, weight, units in case, cases in pallet, etc., and the warehouse control computer may access the SKU database to identify information for the plurality of products for the selected store and sort the products based on the information in the SKU database.

Figure 5:
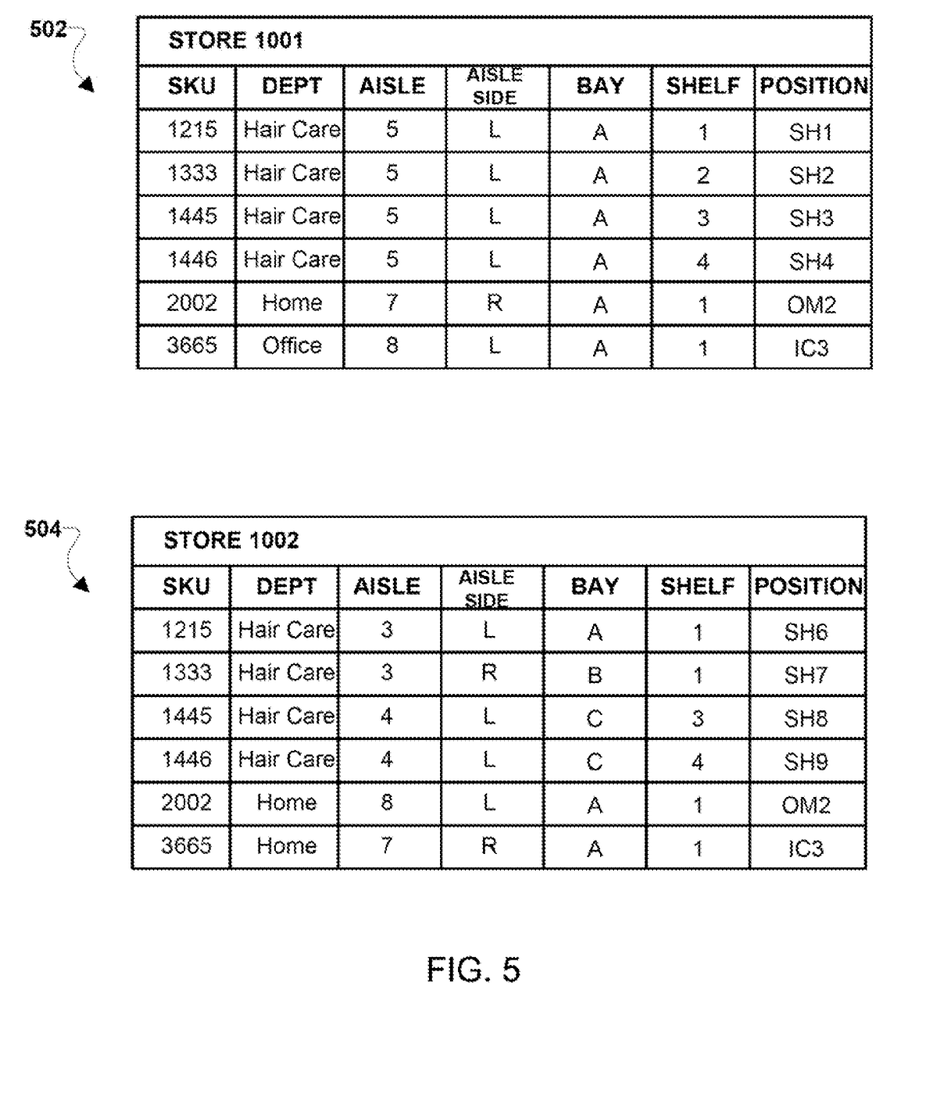
FIG. 5 is a data structure diagram of example planograms.

In determination block 214 the warehouse control computer may determine whether layout information is available for the selected store. As an example, the warehouse control computer may determine whether a planogram for the selected store is stored in a memory available to the warehouse control computer by comparing the store ID of the selected store to store ID information in any stored planograms to identify a match. Example planograms 502 and 504 which may be stored in a memory available to the warehouse control computer are illustrated in FIG. 5. Planogram 502 may indicate it is associated with store 1001 and may list SKU's stocked in store 1001 as well as the location assigned in store 1001 for each SKU, such as by listing the SKU's assigned department in store 1001, assigned aisle in store 1001, assigned aisle side in store 1001, assigned bay in store 1001, assigned shelf in store 1001, assigned position in store 1001, etc. Planogram 504 may indicate it is associated with store 1002 and may list SKU's stocked in store 1002 as well as the location assigned in store 1002 for each SKU, such as by listing the SKU's assigned department in store 1002, assigned aisle in store 1002, assigned aisle side in store 1002, assigned bay in store 1002, assigned shelf in store 1002, assigned position in store 1002, etc. As illustrated in FIG. 5, each store 1001 and 1002 may have a unique layout and unique planogram, and in this manner, by storing the unique planograms 502 and 504, the memory available to the warehouse control computer may store unique layout information for each store.

Returning to FIG. 2, if layout information is available (i.e., determination block 214="Yes"), in block 217 the warehouse control computer may identify a location for each product based on the layout information. In an embodiment, identifying the location of each product may include indicating the location information for the product in an ordered list of products indicated on the fulfillment order stored in a memory available to the warehouse control computer. In a further embodiment, a product may have more than one location in a store. When a product has more than one location in a store, the fulfillment order itself may indicate to which of the multiple locations the ordered product is intended, and the warehouse control computer may identify a location for each product based on the layout information and the location information in the fulfillment order. In block 218 the warehouse control computer may sort the plurality of products within each department based on the identified location. In determination block 220 the warehouse control computer may determine whether all stores have been checked for layout information. If all stores have not been checked (i.e., determination block 220="No"), in block 222 the warehouse control computer may select products associated with the next store in the list, and in blocks 210, 212, and 214 may perform operations discussed above to sort products for the next store based on department and determine whether layout information is available for that store.

If layout information is not available (i.e., determination block 214="No"), in block 216 the warehouse control computer may sort the plurality of products within each department based on a default sequence. As an example, for stores for which layout information is not available, the products may be sorted according to the standard approach taken in the DC, such as sorting according to where the items are located in the DC to reduce worker travel time for item picking.

When all stores have been checked for layout information (i.e., determination block 220="Yes"), in block 224 the warehouse control computer may remove out of stock products from the list of products and in block 226 the warehouse control computer may generate a sorted order pool list. A sorted order pool list may be a list of all products to be assigned to cartons for shipment to the one or more stores. In an embodiment, the warehouse control computer may store the sorted order pool list in a memory available to the warehouse control computer.

Figure 3:
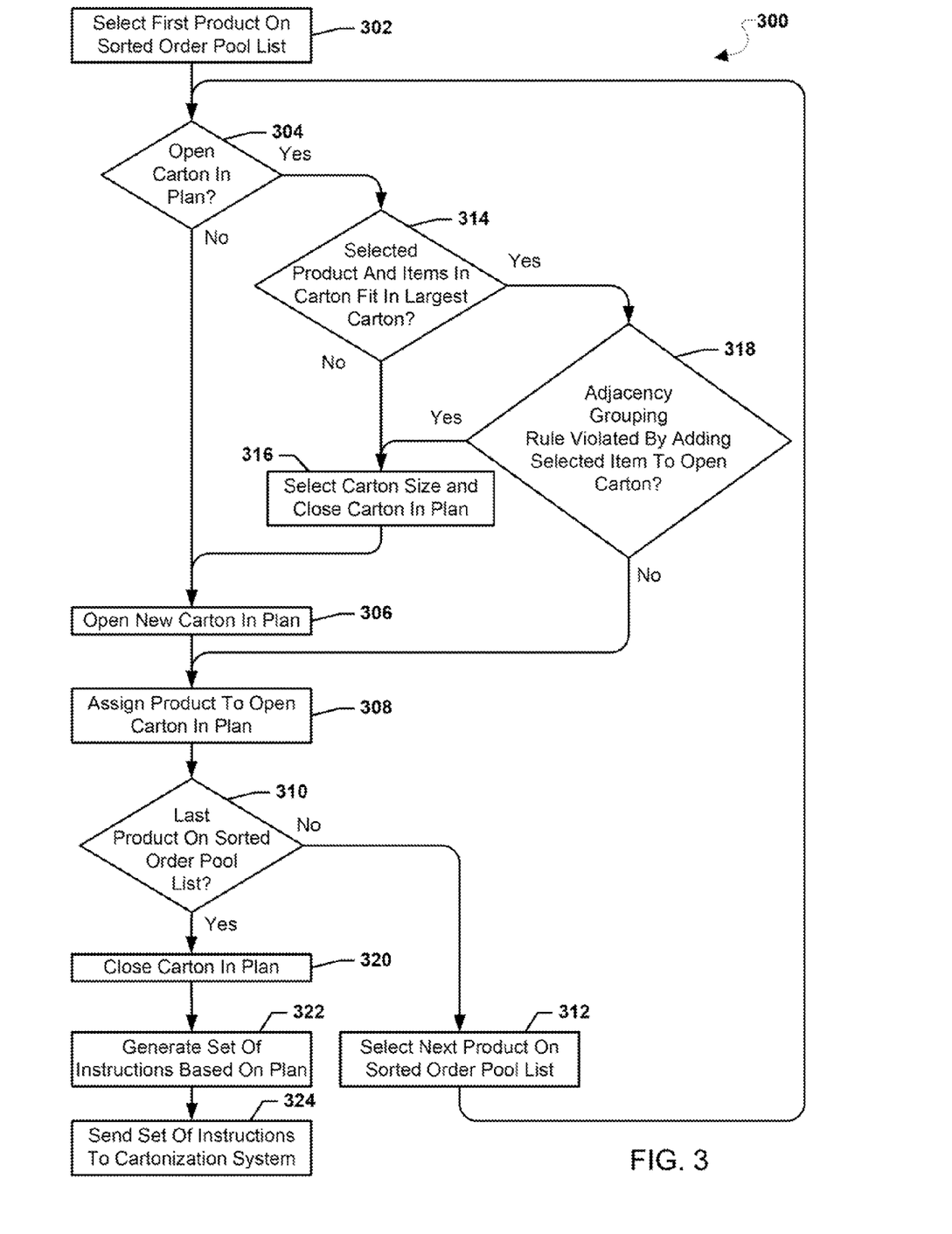
FIG. 3 illustrates an embodiment method for determining a plan for placing products into cartons.

FIG. 3 illustrates an embodiment method 300 for determining a plan for placing products into cartons (e.g., a cartonization plan). In an embodiment, the operations of method 300 may be performed in conjunction with the operations of method 200 described above with reference to FIG. 2. In an embodiment, the operations of method 300 may be performed by the processor of a warehouse control computer.

In block 302 the warehouse control computer may select a first product on a sorted order pool list. In an embodiment, the sorted order pool list may be a sorted order pool list stored in a memory accessible by the warehouse control computer, such as sorted order pool list generated by the warehouse control computer performing operations of method 200 described above with reference to FIG. 2. The first product on the sorted order pool list may be the first SKU in the list which has not yet been assigned to a carton. In determination block 304 the warehouse control computer may determine whether there is an open carton currently available in the plan. As an example, an open carton may be a carton data structure (e.g., a table) in a memory available to the warehouse computer which may be capable of having items assigned to it and is not closed which may be represented by an open flag on a the carton data structure. If a carton is not open in the plan (i.e., determination block 304="No"), in block 306 the warehouse control computer may open a new carton in the plan. As an example, the warehouse control computer may open a new carton by creating a new data structure or portion of a data structure capable of having items assigned to it and set an open flag in the data structure. In block 308 the warehouse control computer may assign the current product to the open carton in the plan. As an example, the warehouse control computer may assign the current product to the open carton in the plan by adding a pointer to an object representing the product to a linked list stored in a carton data structure.

In determination block 310 the warehouse control computer may determine whether the product is the last product on the sorted order pool list. If other products remain on the sorted order pool list which have not been assigned to a carton (i.e., determination block 310="No"), in block 312 the warehouse control computer may select the next product on the sorted order pool list and, as discussed above, in determination block 304 may determine whether there is an open carton in the plan.

If there is an open carton (i.e., determination block 304="Yes"), in determination block 314 the warehouse control computer may determine whether the selected product and the items already assigned to the carton fit in the largest carton size available for shipping items. As an example, the warehouse control computer may determine whether the cube of the current selected item and the items already in the carton actually fits into the carton assuming the largest possible carton size. If the selected product and items already assigned do not fit in the largest possible carton size (i.e., determination block 314="No"), in block 316 the warehouse control computer may select a carton size for the items already in the carton and close the carton in the plan. As an example, the warehouse control computer may select the smallest possible carton size which may accommodate the items that are already assigned to the carton. A size may be assigned to the carton using a size assignment algorithm. As an example, a size assignment algorithm may operate by using list of available carton sizes sorted in descending order of size, and a cube representing the volume occupied by the items assigned to the carton (e.g., the cube of the items or the item cube). For each size on the list, the algorithm may check whether the item cube can fit in the carton and, if it can, whether it is of sufficient size to meet a minimum utilization for that size of carton. If the minimum utilization can be achieved for only one carton size which is large enough to contain the cube, then that size may be assigned to the carton. Otherwise, the carton may be assigned the smallest size which can contain the cube. As discussed above, in block 306 the warehouse control computer may open a new carton in the plan and in block 308 may assign the selected product to the open carton in the plan.

If the selected product and items already assigned do fit in the largest possible carton size (i.e., determination block 314="Yes"), in determination block 318 the warehouse control computer may determine whether an adjacency grouping rule is violated by adding the selected item to the open carton.

Figure 6:
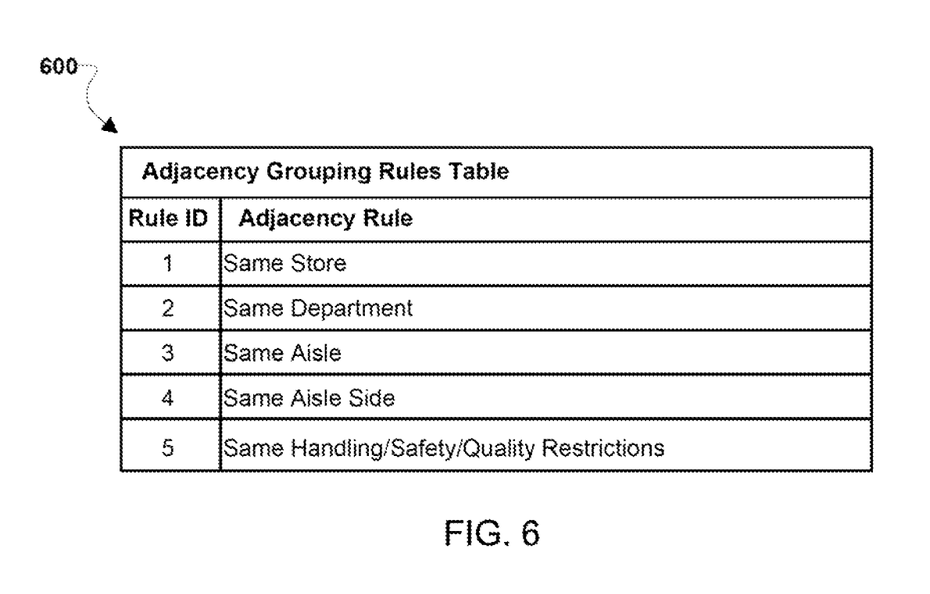
FIG. 6 is a data structure diagram of an example adjacency group rules table.

An adjacency grouping rule may be rule governing allocation of products to containers. In an embodiment, adjacency grouping rules may be stored in an adjacency grouping rules table stored in a memory available to the warehouse control computer. The adjacency grouping rules may serve as hard breaks governing the grouping of products into containers and a violation of an adjacency grouping rule may force the closing of a current carton and the opening of a new carton. An example adjacency grouping rules table 600 is illustrated in FIG. 6. Example, adjacency grouping rules may include rules that products in the container should be destined for the same store, same department, same aisle, and/or same aisle side. In this manner, the distance in a store between the locations of any two products in a container may be limited. Additionally, example adjacency grouping rules may include rules that products in the container should have the same handling restrictions (e.g., all fragile, handle with caution, etc.), safety restrictions (e.g., all are non-flammable, non-corrosive, etc.), and/or quality restrictions (e.g., all have expiration dates within same period, etc.). In an embodiment, the warehouse control computer may compare the locations of the items in the open carton and/or the location of the last item added to the open carton with location of the current selected item to determine whether the difference between the locations (e.g., the distance between the locations) violates an adjacency grouping rule. In a further embodiment, the warehouse control computer may compare handling restrictions, safety restrictions, and/or quality restrictions of the items in the open carton and/or the last item added to the open carton with the handling restrictions, safety restrictions, and/or quality restrictions of the current selected item to determine whether the difference between the handling restrictions, safety restrictions, and/or quality restrictions violates an adjacency grouping rule.

Returning back to FIG. 3, if an adjacency grouping rule is violated (i.e., determination block 318="Yes") the current selected item may not be added to the current open container and as discussed above, in block 316 a carton size may be selected and the carton closed in the plan. If an adjacency grouping rule is not violated (i.e., determination block 318="No") the current selected item may be added to the current open container and as discussed above, in block 308 the warehouse control computer may assign the product to the open carton in the plan. If the product is the last product on the sorted order pool list (i.e., determination block 310="Yes"), in block 320 the warehouse control computer may close the carton in the plan. This may result in a cartonization plan stored in a memory available to the warehouse control computer in which each product on the sorted order pool list is assigned to a carton. An example, cartonization plan 700 is discussed further below with reference to FIG. 7. In block 322 the warehouse control computer may generate a set of instructions based on the plan. The warehouse control computer may generate a set of instructions to control the operations of the one or more cartonization systems to control which of the products should be added to which carton. As an example, the instructions may control a pick to light system and/or put to light system to illuminate of lights on the ends of a pick face showing how many units of a particular item should be added to a carton. As another example, the instructions may control a pick to card system (e.g., a system in which a pick list is printed and the printed pick list directs picking) to print card instructions for a warehouse worker to indicate which products to place in a carton and when a carton should be closed and placed on a takeaway conveyor. As a further example, the instructions may control a voice directed picking system to send voice commands to warehouse worker to indicate which products to place in a carton and when a carton should be closed and placed on a takeaway conveyor. As another example, the instructions may control a sorter system (e.g., loop sorter, batch sorter, tilt-tray sorter, etc.) to place products into cartons. As an additional example, the instructions may control a radio frequency based picking system to place products into cartons. In block 324 the warehouse control computer may send the set of instructions to a cartonization system, such as a pick to light system and/or put to light system, a pick to card system, a voice directed picking system, a sorter system (e.g., loop sorter, batch sorter, tilt-tray sorter, etc.), a radio frequency based picking system, etc. In this manner, when the set of instructions are received by the cartonization system, the cartonization system may execute the instructions to select the assigned products from their locations in the distribution center and add the assigned products to their respective assigned cartons. Once filed according to the instructions, the cartons may be shipped to their respective assigned stores.

Figure 7:
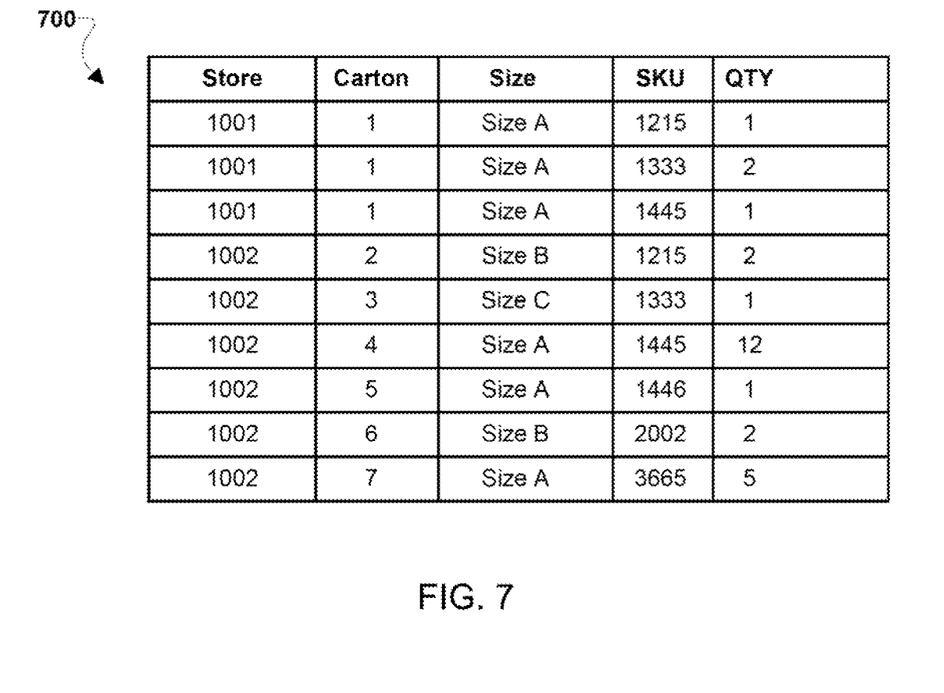
FIG. 7 is a data structure diagram of an example cartonization plan.

FIG. 7 illustrates an example cartonization plan 700 which may be determined at least in part according to the operations of method 300 discussed above with reference to FIG. 3 based on the example fulfillment order 400, example planograms 502 and 504, and example adjacency grouping rules table 600 discussed above with reference to FIGS. 4, 5, and 6, respectively. In an embodiment, the cartonization plan 700 may be stored in a memory available to a processor of a warehouse control computer and may be used by the warehouse control computer to generate instructions to control a cartonization system.

Cartonization plan 700 illustrates how products may be grouped into cartons based on adjacency grouping rules and planogram information. As an example, SKU's "1215", "1333", and "1445" destined for the same store "1001" may be assigned to the same carton "1" because the items fit into a "size A" carton and were destined for the same store "1001", same department "hair care", same aisle "5", and same aisle side "L." The SKU's "1215", "1333", and "1445" may also have the same handling, safety, and quality restrictions, thus the products represented by the SKU's "1215", "1333", and "1445" may be assigned to be packaged in the same container "1". SKU "1215" for store "1002" may not have been assigned to carton "1" because it was destined for a different store "1002" than SKU "1445" which was destined for store "1001". Thus, placing SKU "1215" for store "1002" in carton "1" may have violated adjacency grouping rule "1" and SKU "1215" for store "1002" may be assigned to carton "2". SKU "1333" for store "1002" may not have been assigned to carton "2" because it was destined for a different aisle side "R" than SKU "1215" for store "1002". Thus, placing SKU "1333" for store "1002" in carton "2" may have violated adjacency grouping rule "4" and SKU "1333" for store "1002" may be assigned to carton "3". SKU "1445" for store "1002" may not have been assigned to carton "3" because it was destined for a different aisle "4" than SKU "1333" for store "1002". Thus, placing SKU "1445" for store "1002" in carton "3" may have violated adjacency grouping rule "3" and SKU "1445" for store "1002" may be assigned to carton "4". SKU "1446" for store "1002" may not have been assigned to carton "4" because it would not fit in the largest available carton with SKU "1445" for store "1002". Thus, even though no adjacency grouping rule was violated, SKU "1446" for store "1002" may be assigned to carton "5". SKU "2002" for store "1002" may not have been assigned to carton "5" because it was destined for a different department "home" than SKU "1446" for store "1002". Thus, placing SKU "2002" for store "1002" in carton "5" may have violated adjacency grouping rule "2" and SKU "2002" for store "1002" may be assigned to carton "6". SKU "3665" for store "1002" may not have been assigned to carton "6" because it had different handling restrictions (e.g., fragile) than SKU "2002" for store "1002". Thus, placing SKU "3665" for store "1002" in carton "6" may have violated adjacency grouping rule "5" and SKU "3665" for store "1002" may be assigned to carton "7".

Figure 8:
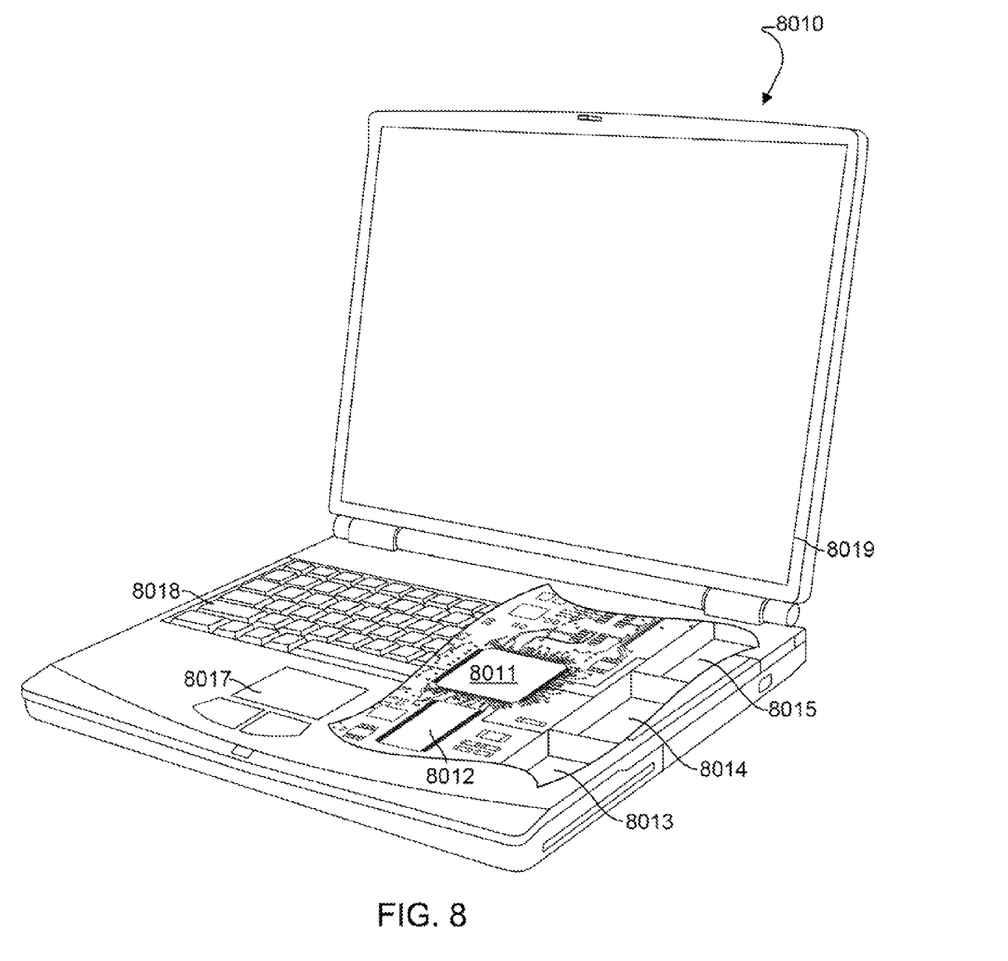
FIG. 8 is a component block diagram of an example warehouse control computer suitable for use with the various embodiments.

The various embodiments described above may also be implemented within a variety of computing devices, such as a warehouse control computer 8010 as illustrated in FIG. 8. A warehouse control computer may include a touch pad touch surface 8017 that serves as the computer's pointing device, and thus may receive drag, scroll, and flick gestures similar to those implemented on mobile computing devices equipped with a touch screen display. A warehouse control computer 8010 will typically include a processor 8011 coupled to volatile memory 8012 and a large capacity nonvolatile memory, such as a disk drive 8013 or Flash memory. The warehouse control computer 8010 may also include a floppy disc drive 8014 and a compact disc (CD) or DVD drive 8015 coupled to the processor 8011. The warehouse control computer 8010 may also include a number of connector ports coupled to the processor 8011 for establishing wired and/or wireless data connections or receiving external memory devices, such as a USB or FireWire® connector sockets, or other wired and/or wireless network connection circuits and/or wired and/or wireless network interfaces for coupling the processor 8011 to wired and/or wireless networks. The connector ports coupled to the processor 8011 may also enable the processor 8011 to establish connections to cloud computing/network resources, such as network/cloud storage resources, network/cloud processing resources, etc. In a notebook configuration, the computer housing may includes the touchpad 8017, the keyboard 8018, and the display 8019 all coupled to the processor 8011. Other configurations of the warehouse control computer 8010 may include a computer mouse or trackball coupled to the processor (e.g., via a USB input) as are well known, which may also be use in conjunction with the various embodiments.

Figure 9:
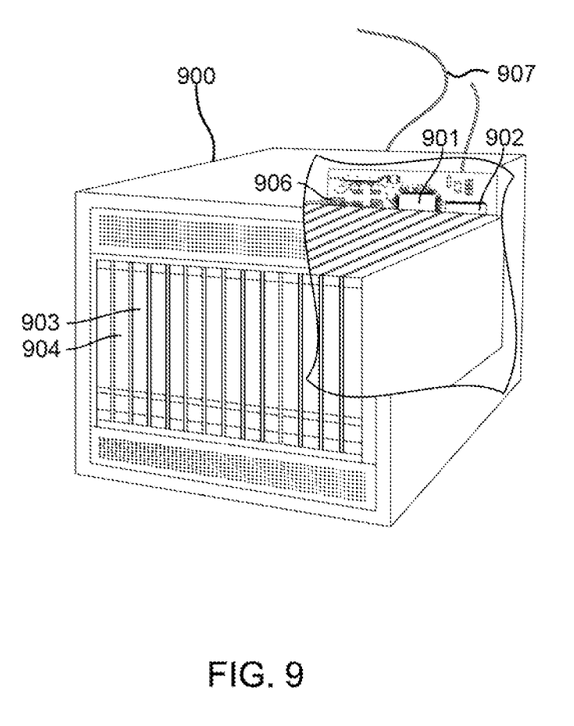
FIG. 9 is a component diagram of an example server suitable for use with the various embodiments.

The various embodiments may also be implemented on any of a variety of commercially available server devices, such as the server 900 illustrated in FIG. 9. Such a server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing network interface connections with a network 907, such as a local area network coupled to other system computers and servers, the Internet, the public switched telephone network, and/or a cellular data networks (e.g., CDMA, TDMA, GSM, PCS, 3G, 4G, LTE, or any other type of cellular data network). The network access ports 906 coupled to the processor 901 may also enable the processor 901 to establish connections to cloud computing/network resources, such as network/cloud storage resources, network/cloud processing resources, etc.

The processors 8011 and 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wired and/or wireless communication functions and one processor dedicated to running other applications. Typically, software applications may be stored in the internal memory 8012, 8013, 904, and 906 before they are accessed and loaded into the processors 8011 and 901. The processors 8011 and 901 may include internal memory sufficient to store the application software instructions. In many devices the internal memory may be a volatile or nonvolatile memory, such as flash memory, or a mixture of both. For the purposes of this description, a general reference to memory refers to memory accessible by the processors 8011 and 901 including internal memory or removable memory plugged into the device and memory within the processor 8011 and 901 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a graphics processing unit (GPU), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, one or more microprocessor in combination with a GPU, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method, comprising:
receiving, at a warehouse control computer, a fulfillment order indicating a plurality of products;
identifying, at the warehouse control computer, a store to which each of the plurality of products is to be shipped;
determining, at the warehouse control computer, a plan for placing each of the plurality of products into a set of cartons based on layout information stored in a memory accessible by the warehouse control computer for each identified store to which each of the plurality of products is to be shipped;
determining, at the warehouse control computer, a plan for placing each of the plurality of products into a set of cartons based on layout information stored in a memory accessible by the warehouse control computer for each identified store to which each of the plurality of products is to be shipped comprises:
identifying, at the warehouse control computer, a location of each of the plurality of products in each identified store to which each of the plurality of products is to be shipped based on the layout information for each identified store;
assigning each of the plurality of products to the set of cartons in the plan such that locations of products in any one carton of the set of cartons in the plan do not violate an adjacency grouping rule by selecting one of a size and a number of cartons to accommodate the plurality of products;
generating, at the warehouse control computer, a set of instructions to control an operation of a cartonization system to control which of the plurality of products should be added to each carton of the set of cartons by automated sorting based at least in part on the determined plan; and
sending the set of instructions from the warehouse control computer to the cartonization system.

2. The method of claim 1, wherein the memory accessible by the warehouse control computer has stored therein unique layout information for each identified store.

3. The method of claim 1, wherein the cartonization system comprises a batch sorter.

4. The method of claim 1, wherein determining the plan for placing each of the plurality of products into the set of cartons comprises:
   determining that layout information is not stored in the memory for at least a portion of a selected identified store to which each of the plurality of products is to be shipped; and
   assigning any products associated with the at least a portion of the selected identified store to a default sequence that are sorted and placed in one or more other containers.

5. The method of claim 1, wherein the cartonization system comprises a loop sorter.

6. The method of claim 5, wherein the loop sorter comprises a selected one of a cross belt sorter and a tilt-tray sorter.

7. The method of claim 1, wherein the layout information of each identified store is a planogram indicating a department, an aisle, an aisle side, a bay, a shelf, and a position that identifies the location of each of the plurality of products in that respective store.

8. The method of claim 7, wherein the adjacency grouping rule is a requirement that products have the same handling, safety, and quality restrictions.

9. The method of claim 7, wherein the adjacency grouping rule is a requirement that the locations of products in any one carton of the set of cartons have a same department and same aisle.

10. The method of claim 9, wherein the adjacency grouping rule is a requirement that the locations of products in any one carton of the set of cartons have the same department, the same aisle, and a same aisle side.

11. A warehouse control computer, comprising;
   a memory; and
   a processor connected to the memory, the processor configured with processor-executable instructions to perform operations comprising:
      receiving a fulfillment order indicating a plurality of products;
      identifying a store to which each of the plurality of products is to be shipped;
      determining a plan for placing each of the plurality of products into a set of cartons based on layout information stored in the memory for each identified store to which each of the plurality of products is to be shipped;
      determining, at the warehouse control computer, a plan for placing each of the plurality of products into a set of cartons based on layout information stored in a memory accessible by the warehouse control computer for each identified store to which each of the plurality of products is to be shipped comprises:
         identifying, at the warehouse control computer, a location of each of the plurality of products in each identified store to which each of the plurality of products is to be shipped based on the layout information for each identified store;
         assigning each of the plurality of products to the set of cartons in the plan such that locations of products in any one carton of the set of cartons in the plan do not violate an adjacency grouping rule by selecting one of a size and a number of cartons to accommodate the plurality of products;
      generating a set of instructions to control an operation of a cartonization system to control which of the plurality of products should be added to each carton of the set of cartons by automated sorting based at least in part on the determined plan; and
      sending the set of instructions to the cartonization system.

12. The warehouse control computer of claim 11, wherein the memory has stored therein unique layout information for each identified store.

13. The warehouse control computer of claim 11, wherein the cartonization system comprises a batch sorter.

14. The warehouse control computer of claim 11, wherein the processor is configured with processor-executable instructions to perform operations comprising:
   determining that layout information is not stored in the memory for at least a portion of a selected identified store to which each of the plurality of products is to be shipped; and
   assigning any products associated with the at least a portion of the selected identified store to a default sequence that are sorted and placed in one or more other containers.

15. The warehouse control computer of claim 11, wherein the cartonization system comprises a loop sorter.

16. The warehouse control computer of claim 15, wherein the loop sorter comprises a selected one of a cross belt sorter and a tilt-tray sorter.

17. The warehouse control computer of claim 11, wherein the processor is configured with processor-executable instructions to perform operations such that the layout information of each identified store is a planogram indicating a department, an aisle, an aisle side, a bay, a shelf, and a position that identifies the location of each of the plurality of products in that respective store.

18. The warehouse control computer of claim 17, wherein the processor is configured with processor-executable instructions to perform operations such that the adjacency grouping rule is a requirement that products have the same handling, safety, and quality restrictions.

19. The warehouse control computer of claim 17, wherein the processor is configured with processor-executable instructions to perform operations such that the adjacency grouping rule is a requirement that the locations of products in any one carton of the set of cartons have a same department and same aisle.

20. The warehouse control computer of claim 19, wherein the adjacency grouping rule is a requirement that the locations of products in any one carton of the set of cartons have the same department, the same aisle, and a same aisle side.

21. A non-transitory processor readable storage medium having stored thereon processor-executable instructions configured to cause a processor to perform operations comprising:
   receiving a fulfillment order indicating a plurality of products;
   identifying a store to which each of the plurality of products is to be shipped;
   determining a plan for placing each of the plurality of products into a set of cartons based on layout information stored in a memory accessible by the processor for each identified store to which each of the plurality of products is to be shipped;
   determining, at the warehouse control computer, a plan for placing each of the plurality of products into a set of cartons based on layout information stored in a memory accessible by the warehouse control computer for each identified store to which each of plurality of products is to be shipped comprises:

identifying, at the warehouse control computer, a location of each of the plurality of products in each identified store to which each of the plurality of products is to be shipped based on the layout information for each identified store;

assigning each of the plurality of products to the set of cartons in the plan such that locations of products in any one carton of the set of cartons in the plan do not violate an adjacency grouping rule by selecting one of a size and a number of cartons to accommodate the plurality of products;

generating a set of instructions to control an operation of a cartonization system to control which of the plurality of products should be added to each carton of the set of cartons by automated sorting based at least in part on the determined plan; and sending the set of instructions from the processor to the cartonization system.

22. The non-transitory processor readable storage medium of claim 21, wherein the processor-executable instructions are configured to cause the processor to perform operations such that the memory accessible by the processor has stored therein unique layout information for each identified store.

23. The non-transitory processor readable storage medium of claim 21 wherein the cartonization system comprises a batch sorter.

24. The non-transitory processor readable storage medium of claim 21, wherein the processor-executable instructions are configured to cause the processor to perform operations comprising:

determining that layout information is not stored in the memory for at least a portion of a selected identified store to which each of the plurality of products is to be shipped; and assigning any products associated with the at least a portion of the selected identified store to a default sequence that are sorted and placed in one or more other containers.

25. The non-transitory processor readable storage medium of claim 21, wherein the processor-executable instructions are configured to cause the processor to perform operations such that the cartonization system comprises a loop sorter.

26. The non-transitory processor readable storage medium of claim 25 wherein the loop sorter comprises a selected one of a cross heft sorter and a tilt-tray sorter.

27. The non-transitory processor readable storage medium of claim 21, wherein the processor-executable instructions are configured to cause the processor to perform operations such that the layout information of each identified store is a planogram indicating a department, an aisle, an aisle side, a bay, a shelf; and a position that identifies the location of each of the plurality of products in that respective store.

28. The non-transitory processor readable storage medium of claim 27, wherein the processor-executable instructions are configured to cause the processor to perform operations such that the adjacency grouping rule is a requirement that products have the same handling, safety, and quality restrictions.

29. The non-transitory processor readable storage medium of claim 27, wherein the processor-executable instructions are configured to cause the processor to perform operations such that the adjacency grouping rule is a requirement that the locations of products in any one carton of the set of cartons have a same department and same aisle.

30. The non-transitory processor readable storage medium of claim 29, wherein the processor-executable instructions are configured to cause the processor to perform operations such that the adjacency grouping rule is a requirement that the locations of products in any one carton of the set of cartons have the same department, the same aisle, and a same aisle side.

* * * * *